United States Patent [19]
Wallack

[11] 3,832,548
[45] Aug. 27, 1974

[54] GAS DETECTOR UNIT

[75] Inventor: Stanley Wallack, Jackson Heights, N.Y.

[73] Assignee: Oceanetics, Inc., Port Washington, N.Y.

[22] Filed: Oct. 18, 1972

[21] Appl. No.: 298,638

[52] U.S. Cl.................. 250/343, 250/504, 250/510
[51] Int. Cl. .......................................... G01n 21/34
[58] Field of Search.......................... 250/43.5 R, 86

[56] References Cited
UNITED STATES PATENTS

| | | | |
|---|---|---|---|
| 2,720,594 | 10/1955 | Hutchins............................ | 250/43.5 |
| 2,741,703 | 4/1956 | Munday............................. | 250/43.5 |
| 2,775,160 | 12/1956 | Foskett et al. ................. | 250/43.5 X |
| 3,551,678 | 12/1970 | Mitchell........................... | 250/43.5 X |
| 3,662,171 | 5/1972 | Brengman et al.............. | 250/43.5 X |
| 3,678,269 | 7/1972 | Malek............................... | 250/43.5 |

Primary Examiner—William F. Lindquist
Attorney, Agent, or Firm—A. W. Breiner

[57] ABSTRACT

An infrared detector for detecting and quantitatively measuring a plurality of select gases in a gaseous medium which includes an infrared (IR) source; a sample cell, continuous or segmented filter means which selectively passes IR waves of the near and intermediate region at varying positions which correspond to a predetermined gas; detector means; means for moving said filter means in conjunction with said sample cell and detector means, and read-out means for each of said gases is described. The described device is compact, utilizes relatively few components, is simple and economical to operate, while providing rapid and accurate readings of the concentration of each of the plurality of gases. The qualitative and quantitative monitoring of gases can be selectively applied to any IR absorbing gas in combination with any other IR absorbing gas.

10 Claims, 4 Drawing Figures

GAS DETECTOR UNIT

FIELD OF INVENTION

This invention relates to an improved infrared (IR) detector device for qualitatively detecting and quantitatively measuring a plurality of select gases in a gaseous medium. More particularly, the invention relates to an IR detector device which is compact, dependable, easy to operate, rapid, and relatively inexpensive for intermittent or continuous monitoring of a plurality of gases in a gaseous medium on a qualitative and quantitative basis. The device includes a source of IR waves, a sample cell for retaining the gas sample, a continuous or segmented filter means which selectively passes IR waves of the near and intermediate regions at varying positions, with each position corresponding to a different predetermined gas, IR detecting means, means for moving said filter means in conjunction with said sample cell and detector means, and read-out means for each of said gases.

BACKGROUND OF INVENTION

Infrared devices are known for detecting the presence of and quantitatively measuring infrared absorbing gases. Inasmuch as most polar or asymmetrical molecules absorb in the near and intermediate IR regions (up to about 15 microns), almost all gases (the terms "gas" or "gases" as employed herein include vapors) can be measured with IR detector devices. Specificity results from the fact that the absorption lines in terms of both intensity and spectral location are characteristic of the substance. However, in some instrumental techniques, overlapping absorption will result in cross-sensitivity unless special optical filtering techniques are employed.

In view of the substantial universal application for IR devices for detecting and measuring gases, various types of instruments differing both in physical principles employed and areas of application have been suggested. Without exception, however, these instruments have one or more disadvantages such as (1) while being simple in concept, require sophisticated optics and expensive components; (2) are capable of detecting and measuring the concentration of only one gas in a given sample at any one time; (3) complex in operation requiring experienced operators; or (4) if capable of analyzing for more than one gas, the complexity is increased to substantially provide a separate unit for each gas, thereby utilizing a great number of components with numerous compensating adjustments necessary. Consequently, IR gas detector devices have been immobile or substantially immobile requiring the gas sample to be brought to the detector device, rather than the device taken to the environment of the gases to be analyzed.

OBJECTS OF THE INVENTION

Accordingly, a primary object of the present invention is to provide a relatively compact and easy to operate IR detector device for accurately and reproducibly detecting and quantitatively measuring the level of a plurality of select gases in a specific environment.

Another object of the present invention is to provide a relatively compact and easy to operate IR detector device for accurately and reproducibly detecting and quantitatively measuring the level of a plurality of select gases in a specific environment on a continuous or intermittent basis.

It is another object of this invention to provide a relatively compact and easy to operate IR detector device for accurately and reproducibly detecting and quantitatively determining the level of a plurality of gases in a specific environment and which thereafter permits a simple adjustment to a second set of select gases.

It is still another object of this invention to provide an IR gas detector device which has rapid response time, good stability, and is capable of detecting and measuring a single or plurality of select gases on a manual and intermittent basis or on an automatic and continuous monitoring basis, which is mobile.

It is still another object of this invention to provide an IR gas detector device capable of intermittent or continuous monitoring of a plurality of select gases which will provide an accurate, rapid, direct, and, if desired, continuous read-out of the concentration of the select gases in the sample.

These and other objects of the present invention will be more readily apparent from the following detailed description with particular emphasis being directed to the drawing and preferred embodiments.

GENERAL DESCRIPTION OF THE INVENTION

The instrument of the present invention whereby the aforesaid objects are accomplished is like other IR detector devices in basic principle and is applicable to the detection of one or more gases which are infrared active, i.e., which will absorb infrared waves in the near or intermediate ranges. Since most polar or asymmetrical molecules absorb in the near and intermediate IR regions, the instrument of this invention is capable of detecting and quantitatively measuring a large number of gases and vapors. As essential elements, the detector device comprises an IR source, a sample cell positioned between, and in the direct path of the IR waves from the IR source, and a detector means. However, as a unique feature of the present invention, filter means are positioned in the optical path, i.e., between the sample cell and detector means or between the IR source and sample cell, which selectively pass specific IR waves of the near and intermediate region at varying positions on the filter means. Accordingly, by properly selecting the characteristics of the filter means, i.e., the wavelength which will be passed by the filter means or a segment thereof, and by correlating the wavelengths with gases which are absorbed at the select wavelength, a plurality of gases can be detected and quantitatively measured merely by "stepping" the filter means to a pre-selected first position corresponding to a first gas to be detected, then to a reference at which no IR is absorbed, to the next pre-selected position to measure a second gas, again to a reference, etc. The results are read directly by, for example, an alpha-numerical system. This permits the analysis of any number of gases, with six to 10 gases being representative and easily programmed. As a result of the filter means, the identical IR analyzer can be employed for each of the gases which is to be monitored, greatly simplifying the apparatus employed as well as reducing the number of components needed for repair or replacement purposes.

THE DRAWING

The detecting device of the present invention will be more readily apparent from the accompanying drawing. In the drawing.

Figure 1:
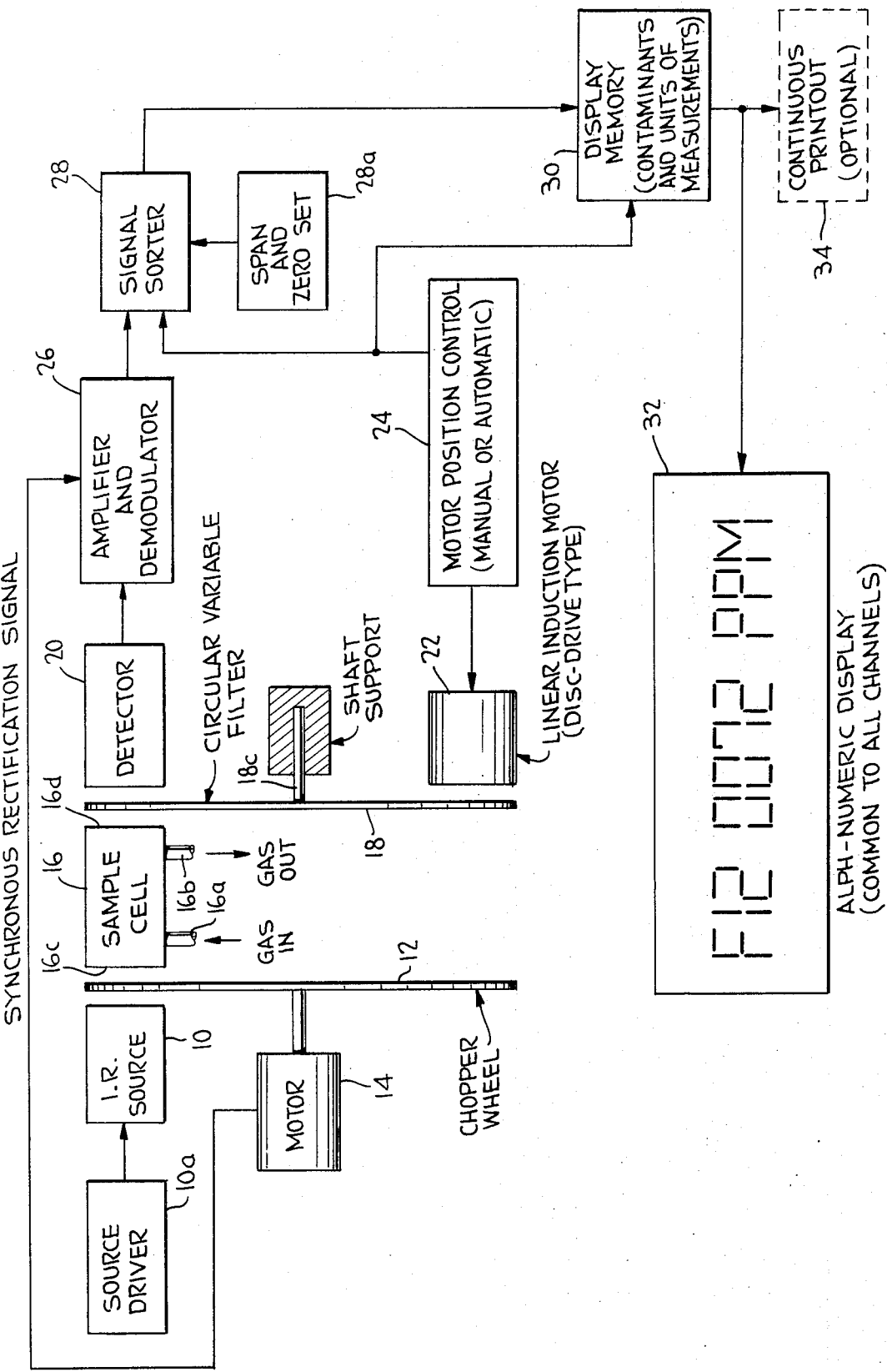
FIG. 1 is a schematic of a detector device of the present invention.

Referring to the schematic of FIG. 1, an IR source 10 driven by source driver 10a emits throughout a broad spectral range as either a black or grey body. Examples of such IR sources are the Nernst glower, Globar, nichrome or tungsten filaments, etc. The source is modulated mechanically by chopper wheel 12 turned by motor 14 to permit utilization of AC circuitry and signal processing. This function can, however, be done electrically, and if desired, tied in with the source driver. This permits the utilization of appropriately tuned circuits with attendant simplifications and reduction of noise. The emitted radiation then passes through a sample tube or cell 16 containing the specimen to be measured. The sample may be either static in the tube or provision may be made to continuously pump the sample through sample tube inlet 16a and outlet 16b using a vacuum or positive pressure pump, or other suitable means, not shown. The two ends of the sample tube 16c and 16d are IR transmissive windows which are transmissive throughout the spectral range of interest. Examples of such windows are IRTRAN, marketed by Eastman Kodak of Rochester, New York, sapphire, rock salt, arsenic trisulfide, etc. Adjacent to the far end of the sample tube and positioned to intercept the infrared radiation exiting from the sample tube is a continuous variable filter 18, preferably of circular configuration. This filter is constructed to provide filter segments which will selectively pass IR waves of a particular wavelength. In a preferred embodiment, the filter will comprise one or more elements which are sectors of a circle and which together cover the entire spectral range of interest, i.e., from about 2.5 to 14.5 microns. Preferably, the filter is of the interference type and so constructed that at one angular position only a single wavelength or narrow band of wavelength is transmitted and this "pass band" varies continuously as the angular position is varied.

Figure 2:
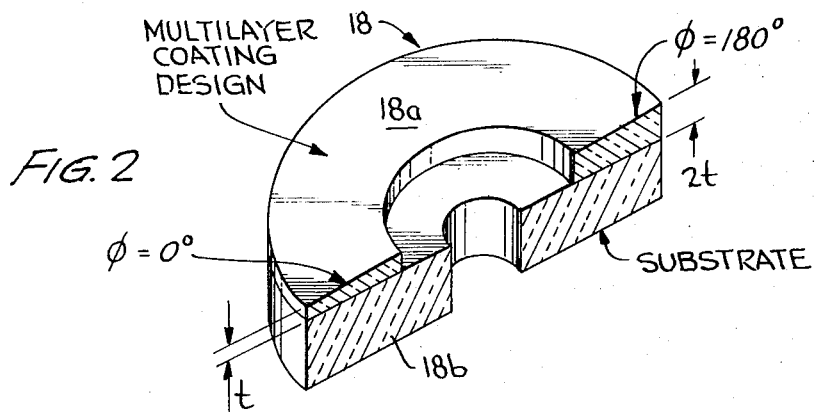
FIG. 2 is a perspective view of a section of a preferred filter means for use in the detector device of FIG. 1.

FIG. 2 shows schematically the construction of a filter wherein a multi-layer coating design 18a is positioned on an IR transmissive substrate 18b, such as sapphire, arsenic trisulfide, IRTRAN, etc. As seen in the drawing, the multi-layer coating design varies from thickness $t$ at zero degrees to thickness $2t$ at 180°. As a result of the construction of this filter, at any one angular position only a single wavelength, or narrow band of wavelengths is transmitted. Thus, by determining the wavelength at which a particular gas absorbs, the absorption point of that gas can be easily coordinated on the filter means. Filters of this type are available from Optical Coating Laboratory, Santa Rosa, Calif.

Figure 3:
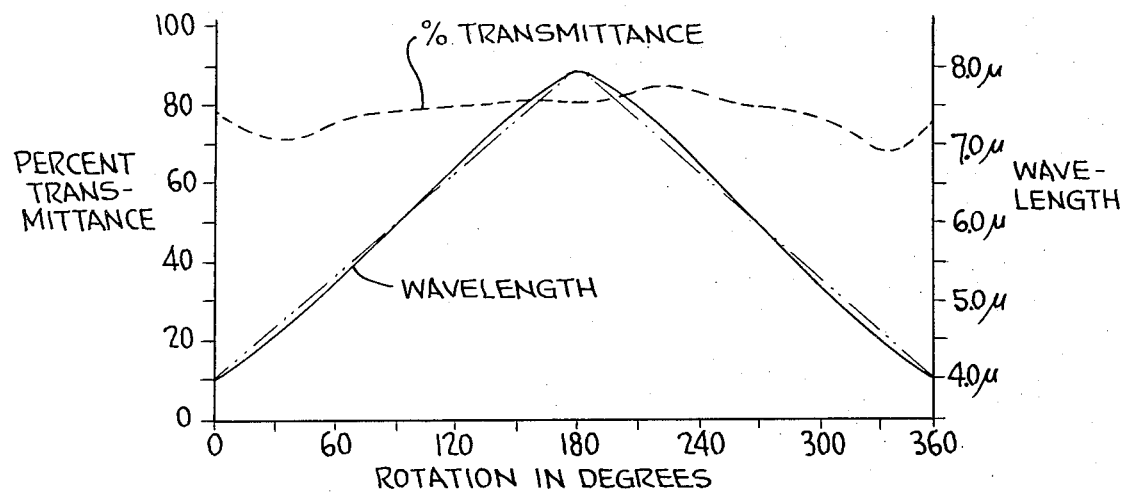
FIG. 3 is a graph showing peak transmittance and center wavelength versus angle of rotation of the filter of FIG. 2.

FIG. 3 illustrates the peak transmittance and center wavelengths as a function of the angle of rotation of the variable filter of circular configuration shown in FIG. 2, and establishes the specificity of the measuring device.

Adjacent to the continuous variable filter 18 is a broad band infrared detector 20. This detector can be any of the commonly employed infrared detectors but generally will be of a thermal rather than quantum type. Examples are the thermopile, thermistor bolometer, or the pyroelectric detector.

The continuous variable filter driven by a linear induction motor 22 on shaft 18c, or by another drive mechanism to sequentially drive the filter to a number of pre-selected positions and dwell in each position for a short period of time, is regulated by motor position control 24. The delay is long enough to determine the quantity of infrared energy traversing the sample tube and arriving at the detector. The filter is then positioned at a reference wavelength where none of the gases present absorb and the sequence repeated continuously for each of the plurality of gases to be measured. After reaching each position and allowing for a short delay for stabilization to take place, the signal is passed to a signal sorter 28. The zero set and span are compensated at 28a in the normal manner. Thereafter the signal is passed to a display memory 30 where the contaminants and units of measurement are read out directly on a suitable meter 32 together with the numerical measure of concentration. Optionally, this data can be continuously printed to form a permanent record at 34. As seen in FIG. 1, after the signal is passed through the detector means, it is amplified and demodulated at 26 before being sent to the signal sorter 28.

Figure 4:
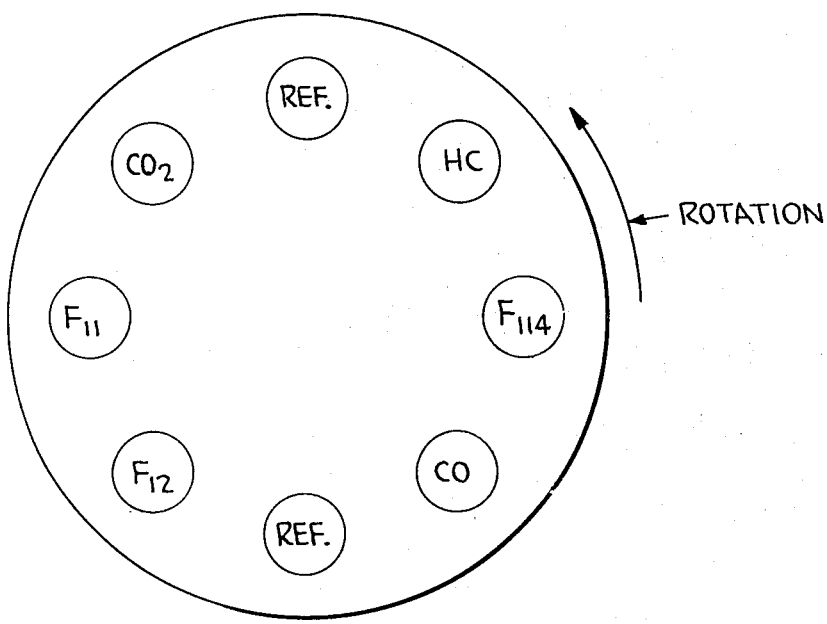
FIG. 4 is a perspective view of a second embodiment of a filter wheel which can be used in accordance with the present invention.

FIG. 4 is a schematic illustration of a second filter means which can be employed in accordance with the present invention. According to this filter means, a plurality of filter segments are positioned on a rotating wheel which selectively pass IR waves in a narrow band. These bands are selected to correspond with the wavelengths at which the gases to be detected and measured are absorbed. The wheel, in addition to containing the filter segments, corresponding to the wavelengths of the gas to be detected, has reference positions at which none of the gases present to be detected will absorb. This embodiment is not as desirable as the embodiment shown in FIG. 2 since the preparation of the filter segments is difficult and, furthermore, a fewer number of gases can be analyzed in a given wheel segment. These filter segments are available commercially, for example, from Eastman Kodak, Rochester, N.Y.; Spectrum Systems, Waltham, Mass.; Infrared Industries, Waltham, Mass.; etc.

The system of FIG. 1 can be modified to accommodate ten channels corresponding to a possibility of ten gases to be detected. This schematic will be used to define a specific embodiment of such a system. Thus, in an environment such as a submarine where it is desirable or essential to detect the presence of and quantitatively measure the concentration of a plurality of gases such as Freon-11 (trichloromonofluoromethane); Freon-12 (dichlorodifluoromethane); Freon-114 (dichlorotetrafluoroethane); carbon monoxide; carbon dioxide, and hydrocarbons, it can be determined from the literature at which wavelength each of these gases absorb. Channels corresponding to these positions will be set on the filter means. Accuracy of this setting is easy to achieve. The sample cell 16 is filled with the material to be detected and the filter means manually moved through the absorption peak. At the point where a minimum reading is reached, the filter is positioned optimally and a mechanical stop is set so that linear induction motor 22 thereafter will stop at this position. Thereafter positions (wavelengths) will be selected where none of the gases present in the sample will be absorbed. These will be established as convenient reference positions. Based on the literature, the following sequence of operation will be established:

| | Channel | Wavelength (microns) | Reference (microns) |
|---|---|---|---|
| Freon-11 | 1 | 9.4 | |
| Reference | | | 10 |
| Freon-12 | 2 | 8.7 | |
| Reference | | | 10 |
| Freon-114 | 3 | 8.4 | |
| Reference | | | 10 |
| Blank | 4 | | |
| Blank | 5 | | |
| Carbon Monoxide | 6 | 4.7 | |
| Reference | | | 3.5 |
| Carbon Dioxide | 7 | 4.3 | |
| Reference | | | 3.5 |
| Blank | 8 | | |
| Hydrocarbon | 9 | 3.05 | |
| Reference | | | 3.5 |
| Blank | 10 | | |

Accordingly, IR source 10 of radiation as defined above will be driven and modulated by suitable means 10a and 12 to develop IR waves which will be directed to and through sample cell or tube 16 toward detector 20. Intermediate of the detector 20 and cell sample 16 is position filter means 18 which will pass IR waves within the range of 2.5 and 14.5 dependent upon its position in relation to the sample tube and detector. The filter means is of the type shown in FIG. 2. Positions are selected on this filter means which correspond to the gas absorbing wavelengths noted above, i.e., 9.4 microns for Freon-11; 8.7 microns for Freon-12; 8.4 microns for Freon-114; 4.7 microns for carbon monoxide; 4.3 microns for carbon dioxide, and 3.05 microns for hydrocarbons. Reference positions 1 and 2 are established at 10 microns and 3.5 microns, respectively. Since only six gases are being detected, there will be four blank channels. When the detector device is set at automatic at motor position control 24, the unit will go through sequential operations as follows; motor 22 will drive the filter means to channel 1 at 9.4 microns; a short delay is programmed to permit sufficient time for the intensity of IR to be determined before stepping to reference position 1 at 10 microns to again detect the intensity of IR; after stopping at the reference position, the stepping meter will drive the filter means to channel 2 at 8.7 microns, again delay sufficient to measure the IR intensity; step to reference 1 at 10 microns; step to channel 3 at 8.4 microns; delay; step to reference 1 at 10 microns; skip through blank channels 4 and 5; step to channel 6 for carbon monoxide at 4.7 microns, delay, and step to reference position 2 at 3.5 microns; step to channel 7 at 4.3 microns, delay, and step to reference 2 at 3.5 microns; skip through blank channel 8 to channel 9 at 3.05 microns for hydrocarbons, delay and step to reference position 2 at 3.5 microns; pass through blank position 10 and assume the same operation continuously until shut down. The stepping motor can be of any conventional type and preferably will be reversible.

During the stepping operation noted above, as apparent from the schematic of FIG. 1, the signal from the detector is amplified and demodulated and then fed to a signal sorter. The signal sorter performs the essential function of comparing each signal of interest with the appropriate reference signal thereby obtaining the difference in signal which is the measure of the concentration of the contaminant of interest. The signal sorter also separates the signals so that each concentration of gas can be displayed on individual signal meters, or the read out can be from a common alpha-numerical system displaying both the gas and concentration of the gas and the units, i.e., percent, parts per million, millimeters of pressure, or the like, as shown at 32. If read on individual meters, the display memory is not needed.

As apparent, when it is desired to monitor the position of an additional gas, it is only necessary to select the proper wavelength at which the gas absorbs and insert the information into an appropriate blank channel. Moreover, it is possible to substitute a new gas for one previously monitored. To do this the infrared absorption spectrum of the gas is examined to determine a region where strong absorption takes place and interference with other gases does not occur. The channel tube is then filled with a suitable concentration of this gas and the circular variable filter manually rotated until minimum detector output is observed as before. This indicates that the filter is positioned to coincide with the absorption band of the sample. The position control unit is then set so that for this channel the filter will return to its orientation. A suitable reference band would also be positioned. The display memory unit is set to indicate the contaminant and units of measurement.

Using non-absorbing nitrogen and calibration gases, zero and span settings for the channel are made which would complete the setting up of a channel for a new gas contaminant.

As will be apparent when the device is placed on manual, it can be individually stepped through the various channels in a complete sequence or in any part of the sequence.

As further apparent from the aforesaid, the detector unit of the present invention can be designed to measure the concentration of a single or any reasonable number of infrared active gases simultaneously. The instrument is stable and has a high degree of sensitivity. The improved stability results in part from the fact that both the reference and contaminant signal are generated through the operation of a single IR source, optical path, detector, and electronics. Accordingly, the only difference between the two signals results from the interposition and reorientation of a passive optical filter. Any change in any of these elements will affect both the contaminant and reference signal equally and will, therefore, be cancelled out when the signals are processed. Cross-sensitivity is minimized or eliminated. Further, increased reliability is obtainable with the detector of the present invention due to the simplicity of the instrument and elimination of redundancy of sources, detectors, and electronics. The inherent error in operation of a device which requires the proper functioning of a number of components is eliminated due to the relatively few components and the interrelation of these components. Furthermore, as a result of the few number of parts in the detector unit, less problem is encountered in servicing the units.

As will be apparent to one skilled in the art, various modifications can be made to the disclosed detector device without departing from the inventive concept herein disclosed. For example, it is indicated that the filter means is preferably circular. However, the filter means can be of linear configuration. Additionally, while the schematic indicates that a common read-out meter will be used for all gas, it is possible to use a single meter for each gas with attendant adjustments in the electronics. Moreover, while the device is described with reference to gases, it is possible to pass a liquid sample through the sample cell and measure the contaminants in the liquid sample. These modifications being within the ability of one skilled in the art are covered in accordance with the present invention.

It is claimed:

1. A detecting and measuring device for detecting the presence or absence of, and quantitatively measuring for a plurality of gases in a gaseous medium comprising in combination a single infrared source, a single sample cell for retaining a sample aligned to receive IR waves in a single path from said source, filter means having a plurality of positions where only IR waves of select wavelength pass, said filter means aligned to receive IR waves in said single path from said source; IR detector means aligned to receive IR waves passing through said filter means and sample cell, and means for moving said filter to a first predetermined position for detecting a first gas and then to a predetermined reference position to quantitatively determine the amount of detected gas in said sample cell, and thereafter moving said filter through a plurality of predetermined positions on said filter means to detect and quantitatively measure for a plurality of gases in said sample cell, said moving means including means for stopping said filter means at each position; and readout means for the gas and concentration of said gas.

2. The device of claim 1 wherein said filter means comprises a filter which will pass IR waves at any length throughout a given range.

3. The device of claim 2 wherein said filter means is of circular configuration.

4. The detector of claim 1 including modulating means between said IR source and sample cell.

5. The device of claim 4 wherein said modulating means are mechanical means.

6. The device of claim 5 wherein said mechanical means is a chopper wheel.

7. The device of claim 1 wherein the read-out means includes memory means and signal sorter means.

8. The device of claim 7 wherein said read-out includes continuous printer means.

9. The device of claim 1 including programming means for continuously moving said filter to said first position for detecting a first gas; to said reference position to quantitatively determine the amount of said first detected gas and thereafter through a plurality of positions on said filter means to detect and quantitatively measure for a plurality of gases.

10. A method for detecting the presence or absence of and quantitatively measuring for a plurality of gases in a gaseous medium comprising projecting IR waves in a single path from a single infrared source through filter means and a single sample cell retaining a sample of gaseous medium from which gases are to be detected and, if present, quantitatively measured, said filter means having a plurality of positions where only IR waves of select wavelengths pass, detecting the wavelengths which pass through said sample and filter means at each of said positions on said filter means, said method including continuously moving said filter from a first predetermined position for detecting a first gas; to a predetermined reference position for said first gas to compare the IR waves which have passed through at said first position and determine the quantity of said first gas, and sequentially repeating the steps until each of the plurality of gases has been detected and measured.

* * * * *